United States Patent
Hiramatsu et al.

(10) Patent No.: US 10,657,342 B2
(45) Date of Patent: May 19, 2020

(54) PORTABLE WIRELESS COMMUNICATION TERMINAL INSTALLED ON A SHOPPING CART

(71) Applicant: TOSHIBA TEC KABUSHIKI KAISHA, Tokyo (JP)

(72) Inventors: Kenya Hiramatsu, Tokyo (JP); Takashi Nakajima, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/141,651

(22) Filed: Sep. 25, 2018

(65) Prior Publication Data

US 2019/0095667 A1    Mar. 28, 2019

(30) Foreign Application Priority Data

Sep. 26, 2017   (JP) ................. 2017-184400

(51) Int. Cl.
| | |
|---|---|
| G06K 15/00 | (2006.01) |
| G06K 7/14 | (2006.01) |
| G06Q 20/20 | (2012.01) |
| G06Q 20/38 | (2012.01) |
| G07G 1/00 | (2006.01) |

(52) U.S. Cl.
CPC ......... *G06K 7/1413* (2013.01); *G06Q 20/208* (2013.01); *G06Q 20/387* (2013.01); *G07G 1/0081* (2013.01)

(58) Field of Classification Search
CPC .. G06K 7/1413; G06Q 20/208; G06Q 20/387; G07G 1/0081
See application file for complete search history.

(56) References Cited

U.S. PATENT DOCUMENTS

| | | | | |
|---|---|---|---|---|
| 2009/0094100 | A1* | 4/2009 | Xavier | G06Q 20/20 705/16 |
| 2011/0022468 | A1* | 1/2011 | Muster | G06Q 30/00 705/14.58 |
| 2011/0320278 | A1* | 12/2011 | Littman | G06Q 30/02 705/14.58 |
| 2012/0041845 | A1* | 2/2012 | Rothschild | G06Q 20/20 705/26.81 |
| 2012/0259741 | A1* | 10/2012 | Iwabuchi | G06Q 30/06 705/27.1 |

(Continued)

FOREIGN PATENT DOCUMENTS

JP    2007-206832 A    8/2007

*Primary Examiner* — Thien M Le
(74) *Attorney, Agent, or Firm* — Kim & Stewart LLP

(57) ABSTRACT

A portable wireless communication terminal installed on a shopping cart includes a reader, a wireless communication interface, a display, and a processor. The processor is configured to control the reader to read a commodity code that identifies a commodity to be purchased by a customer in a store, determine whether or not the commodity code read by the reader is associated with the store, determine a retrieval code based on a result of the determination about the commodity code, wirelessly retrieve from a database through the wireless communication interface, one or more pieces of information for promotion using the determined retrieval code, and control the display to display one of the retrieved pieces of information about a commodity available for sale in the store.

20 Claims, 7 Drawing Sheets

(56) References Cited

U.S. PATENT DOCUMENTS

| | | | |
|---|---|---|---|
| 2012/0296751 A1* | 11/2012 | Napper | G06Q 20/208 |
| | | | 705/23 |
| 2014/0183269 A1* | 7/2014 | Glaser | G06F 21/32 |
| | | | 235/492 |
| 2014/0214577 A1* | 7/2014 | Acker, Jr. | G07G 1/0081 |
| | | | 705/23 |
| 2014/0214596 A1* | 7/2014 | Acker, Jr. | G06Q 30/0633 |
| | | | 705/26.8 |
| 2015/0213434 A1* | 7/2015 | Fletcher | G06Q 20/20 |
| | | | 705/14.27 |

\* cited by examiner

| PROMOTION INFORMATION ID |
| PROVIDER ID |
| PROMOTION PERIOD |
| PROMOTION INFORMATION |
| PROMOTION COMMODITY INFORMATION |
| RETRIEVAL TARGET FLAG<br>0: COMMON COMMODITY CODE  1: CATEGORY CODE |
| RETRIEVAL CODE |
| OFFER INFORMATION |
| BIDDING PRICE |
| BIDDING DECISION INDEX |
| CONVERSION RATE |

| PROVIDER ID |
| PROVIDER NAME |
| COST |

PORTABLE WIRELESS COMMUNICATION TERMINAL INSTALLED ON A SHOPPING CART

CROSS-REFERENCE TO RELATED APPLICATION

This application is based upon and claims the benefit of priority from Japanese Patent Application No. 2017-184400, filed in Sep. 26, 2017, the entire contents of which are incorporated herein by reference.

FIELD

Embodiments described herein relate generally to a portable wireless communication terminal installed on a shopping cart.

BACKGROUND

In recent years, a tablet-type information terminal is installed on a shopping cart to provide a customer with various kinds of information, such as an offer for a recommended commodity, a coupon for discounting a commodity price, and a store map.

However, in such a conventional system, the information to be provided needs to be managed by each store, which puts a burden on the store side in terms of workloads and costs for preparing and updating the information.

DESCRIPTION OF THE DRAWINGS

FIG. 2 is a schematic diagram illustrating a data structure of a data record stored in a promotion information database;

FIG. 3 is a schematic diagram illustrating a data structure of a data record stored in a provider database;

DETAILED DESCRIPTION

In accordance with an embodiment, a portable wireless communication terminal installed on a shopping cart includes a reader, a wireless communication interface, a display, and a processor. The processor is configured to control the reader to read a commodity code that identifies a commodity to be purchased by a customer in a store, determine whether or not the commodity code read by the reader is associated with the store, determine a retrieval code based on a result of the determination about the commodity code, wirelessly retrieve from a database through the wireless communication interface, one or more pieces of information for promotion using the determined retrieval code, and control the display to display one of the retrieved pieces of information about a commodity available for sale in the store.

Hereinafter, an embodiment of an information providing apparatus that can provide information to a consumer in the process of shopping without increasing burden of a store side for information management is described with reference to the accompanying drawings.

Figure 1:
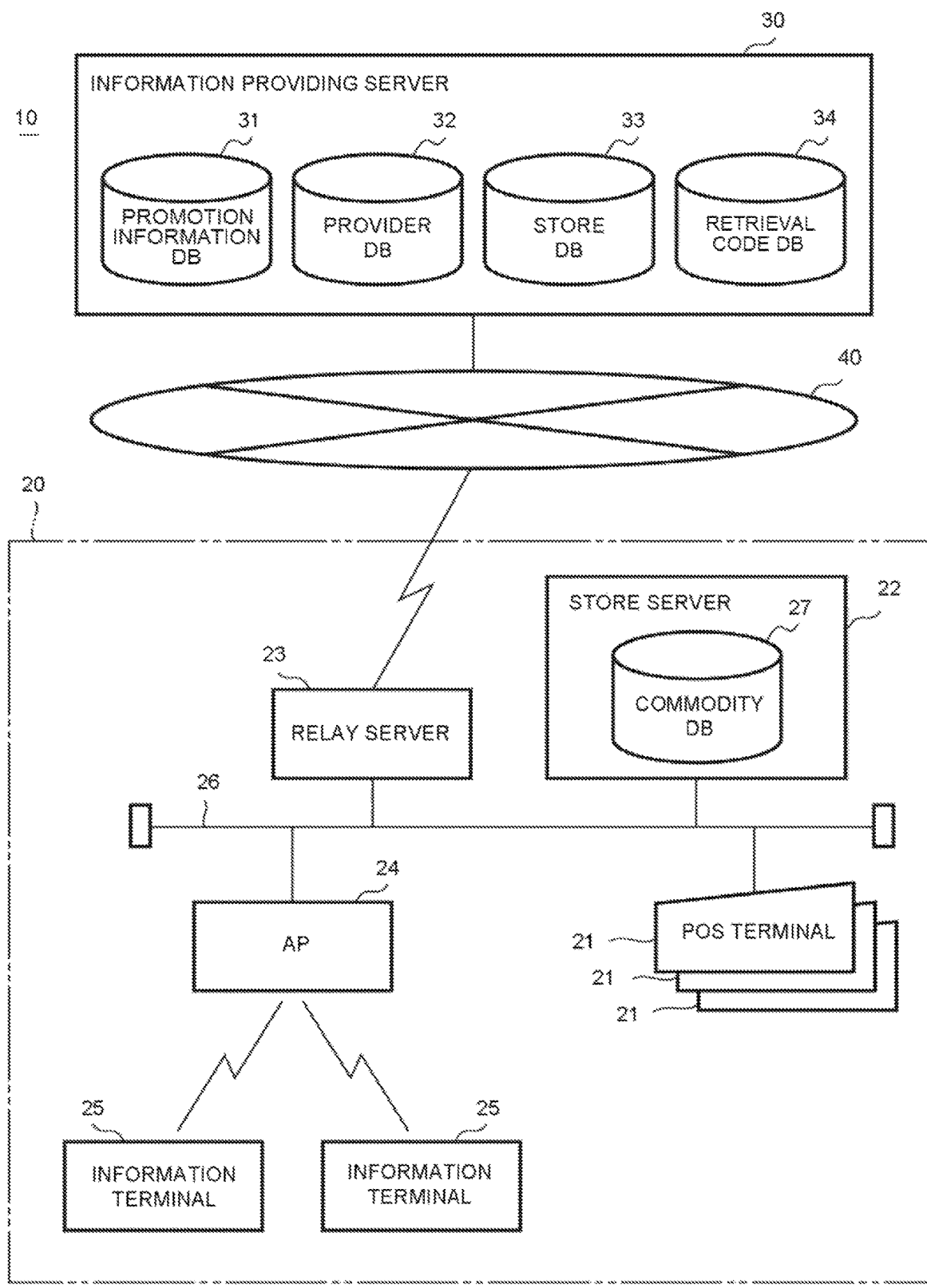
FIG. 1 is a schematic block diagram illustrating an information providing system including an information providing apparatus according to an embodiment.

FIG. 1 is a schematic block diagram illustrating an information providing system 10 including an information providing apparatus according to an embodiment. The information providing system 10 includes a store system 20 built in each store, and one information providing server 30 shared by each store system 20. The information providing server 30 is a computer managed by a business entity. The store system 20 is built for each affiliated store using the information providing service from the information providing server 30. The information providing server 30 and each store system 20 are connected with each other by a general-purpose network 40 such as the Internet. In FIG. 1, the store system 20 in only one store is shown. Since the basic structure of the store system in other stores is common, the description thereof is omitted here.

The store system 20 includes at least a POS (Point Of Sales) terminal 21, a store server 22, a relay server 23, an access point (AP) 24 and an information terminal 25. The POS terminal 21, the store server 22, the relay server 23, and the access point 24 are connected via a LAN (Local Area Network) 26, respectively. The information terminal 25 has a wireless communication function and is capable of performing two-way data communication in a wireless manner with the access point 24.

The POS terminal 21 has a registration function of registering sales data of a commodity purchased by a consumer (e.g., shopper) to calculate a payment amount of a commercial transaction and a settlement function of processing payment data of the customer for the above payment amount to settle the transaction. A face-to-face type POS terminal, a self-checkout type POS terminal, or a semi-self-checkout type POS terminal may be provided as the POS terminal 21. The face-to-face type POS terminal is operated by a store clerk to perform a registration related operation and a settlement related operation. The self-checkout POS terminal is operated by a customer to perform the registration related operation and the settlement related operation. The semi-self-checkout POS terminal refers to a POS terminal which is operated by the store clerk to perform the registration related operation and is operated by the customer to perform the settlement related operation. The number of POS terminals 21 installed in one store is not particularly limited. A plurality of POS terminals 21 may be connected to the LAN 26 in some cases. In that case, only one type of POS terminal 21 may be connected, or two or more types of POS terminals 21 may be connected in a mixed manner.

The store server 22 is a computer that collects and analyzes so-called transaction data, i.e., information of one transaction processed by the POS terminal 21, and manages sales, inventory, etc. of the entire store. Here, the store server 22 constitutes a POS system together with the POS terminal 21.

The store server 22 also has a commodity database (DB) 27. The commodity database 27 stores a data record relating to each commodity sold in the store. The data record is an aggregate of data such as a commodity code, a commodity name, a price, and the like. The commodity code is a unique code for individually identifying a commodity. The commodity code includes a common commodity code (e.g., source marking code) such as a JAN (Japan Article Number) code which is standardized in the distribution industry, and a store-specific commodity code (e.g., in-store marking code) set independently by each store. Generally, since a common commodity code is not set for fresh food, such as meat, fresh fish, vegetables, etc., only the store-specific commodity code is used for the fresh food. Upon receiving an inquiry about the commodity code from the POS terminal 21 or the information terminal 25, the store server 22 retrieves the commodity database 27, detects a data record including the commodity code, and replies the POS terminal 21 or the information terminal 25 that issues the inquiry with the data contained in the data record.

The relay server 23 is connected to the LAN 26 and to the network 40. The relay server 23 has a function of transmitting data received via the LAN 26 to the information providing server 3 via the network 40 and a function of transmitting data received via the network 40 to the information terminal 25 via the LAN 26.

The access point 24 performs two-way data communication with the information terminal 25 located within a wireless communication region using a predetermined wireless communication method. The wireless communication region includes at least a sales floor in which a commodity is displayed in the store. If one access point 24 cannot cover the entire sales floor, it is preferable to place a plurality of access points 24 in a scattered manner such that the entire sales floor is contained in the wireless communication region.

The information terminal 25 is, for example, a tablet type wireless communication terminal. The information terminal 25 includes an input device for inputting a commodity code and a display device for displaying information. Typically, the information terminal 25 is operated by the customer who is a shopper in the store. The information terminal 25 may be a device carried by a customer to be used, or may be a device attached to a shopping cart to be used. At the time of shopping at the sales floor, the consumer operates the input device to input a commodity code of a commodity to be purchased to the information terminal 25. By doing so, information relating to the commodity specified by the commodity code is displayed on the display device of the information terminal 25. Specifically, a commodity name, a price, and the like associated with the commodity code and stored in the commodity database 27 are displayed. Promotion information provided from the information providing server 30 may be displayed.

The information providing server 30 includes a promotion information database (DB) 31, a provider database (DB) 32, a store database (DB) 33, and a retrieval code database (DB) 34. The promotion information database 31 manages so-called promotion information, i.e., the information offered to the consumer in the process of shopping. The provider database 32 manages information relating to a provider who provides the promotion information. The store database 33 manages information relating to affiliated stores in each of which the store system 20 is built in. The retrieval code database 34 manages information relating to a retrieval code. The retrieval code is described later.

FIG. 2 is a schematic diagram illustrating the data structure of a data record 31R stored in the promotion information database 31. The promotion information database 31 stores the data record 31R created for each information offered to the consumer in the process of shopping. The data record 31R includes data such as a promotion information ID, a provider ID, a promotion period, the promotion information, promotion commodity information, a retrieval target flag, the retrieval code, offer information, a bidding price, a bidding decision index, a conversion rate and the like.

The promotion information ID is a unique code set for each promotion information to individually identify the promotion information. The provider ID is a unique code set for each provider to identify the provider of the promotion information. The promotion period is information relating to a period during which the promotion information is offered to the consumer. The promotion period may be indicated by a start date and an end date of the period, or may be indicated by the number of days from the start date to the end date.

The promotion information is offered to a customer who wants to purchase the commodity, and is information relating to another commodity (hereinafter, referred to as a purchase intention commodity) associated with the commodity that the consumer wants to purchase. For example, the promotion information is an image for introducing a commodity which is material of cooking menu using the purchase intention commodity, an image for introducing a commodity which is purchased in combination with the purchase intention commodity to obtain privileges such as coupons. The image may be a still image or a moving image. The image may contain a text for describing the commodity along with the image of the commodity. Alternatively, the promotion information may only contain the text without containing the image. If the information terminal 25 is provided with a speaker, the promotion information may include music together with the image or the text.

The promotion commodity information can specify the commodity introduced by the promotion information. In an embodiment, the promotion commodity information is a name of the commodity. For example, if the promotion information is an image for introducing the commodity which is material of a menu, the promotion commodity information is a name of the commodity which is the material. For example, if the promotion information is an image for introducing a commodity for which privileges such as coupons can be obtained by purchasing in combination with the purchase intention commodity, the promotion commodity information is a name of the commodity for which privileges can be obtained.

The retrieval target flag identifies whether the retrieval code used for retrieving the promotion information database 31 is a common commodity code or a category code. The category code is uniquely set for a commodity such as fresh food to which no common commodity code is set. In an embodiment, the retrieval target flag is set to "0" when the retrieval code is the common commodity code, and is set to "1" when the retrieval code is the category code.

The retrieval code is a common commodity code for the data record 31R in which the retrieval target flag indicates the common commodity code. The retrieval code is a category code for the data record 31R in which the retrieval target flag indicates the category code.

The offer information indicates an applicable sales promotion (e.g., discount amount or granted point) that the provider of the promotion information grants to the consumer who purchases the commodity indicated by the promotion information. For example, if a service point containing 20 points is granted to the consumer who purchases the commodity indicated by the promotion information, the offer information is "grant of 20 points". For example, if a discount of 10 Yen is granted to the consumer who purchases the commodity indicated by the promotion information, the offer information is "10 Yen discount". If no privilege is granted to the consumer, the offer information is "none".

The bidding price refers to an amount (i.e., promotion cost) that the provider of the promotion information is paid as an expense to the business entity which is a management source of the information providing service each time the promotion information is provided to the consumer. The bidding price is decided by the provider.

The bidding decision index is a number determined by the bidding price, the offer information and the retrieval target range. Specifically, the bidding decision index is calculated by dividing a sum of the biding price and the offer information, with the number of retrieval target commodities. The number of the retrieval target commodities refers to the number of matched commodities after retrieving the commodity database 27 of the target store according to the combination of the retrieval target flag and the retrieval code. Incidentally, when adding the bidding price to the offer information, if the offer information indicates a discount amount, the discount amount is used. If the offer information indicates the granted point, a discount amount equivalent to the granted point is used.

The conversion rate indicates a rate of the number of actual purchases of the commodity offered by the promotion information, to the number of appearances of the promotion information on the information terminal 25.

FIG. 3 is a schematic diagram illustrating the data structure of a data record 32R stored in the provider database 32. The provider database 32 stores the data record 32R created for each provider. The data record 32R includes data such as a provider ID, a provider name, and a cost.

Figure 4:
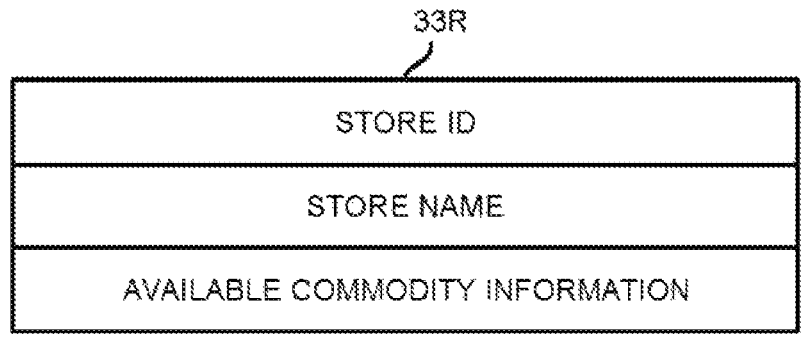
FIG. 4 is a schematic diagram illustrating a data structure of a data record stored in the store database.

The provider name is a name of the provider identified by the provider ID. The provider is typically a manufacturer of the commodity. A retail store may be a provider in some cases. The cost is an amount stocked for the provider to pay the expenses (i.e., bidding price) to the business entity FIG. 4 is a schematic diagram illustrating the data structure of a data record 33R stored in the store database 33. The store database 33 stores the data record 33R created for each affiliated store. The data record 33R includes data such as a store ID, a store name, and available commodity information.

The store ID is a unique code set for each affiliated store to individually identify each affiliated store. The store name is a name of the store identified by the store ID. The available commodity information is a list of commodity codes and commodity names of the commodities available for sale at the store identified by the store ID. The available commodity information may be a list further including items other than the commodity code and the commodity name. The available commodity information is created based on the commodity database 27 managed by the store server 22 in the store. For example, the store server 22 creates available commodity information and transmits it to the information providing server 30 every time there is a change in the data record of the commodity database 27. If the available commodity information is received from the store server 22, the information providing server 30 specifies the store ID and updates the available commodity information stored in the store database 33 in association with the store ID with the latest information received from the store server 22.

Figure 5:
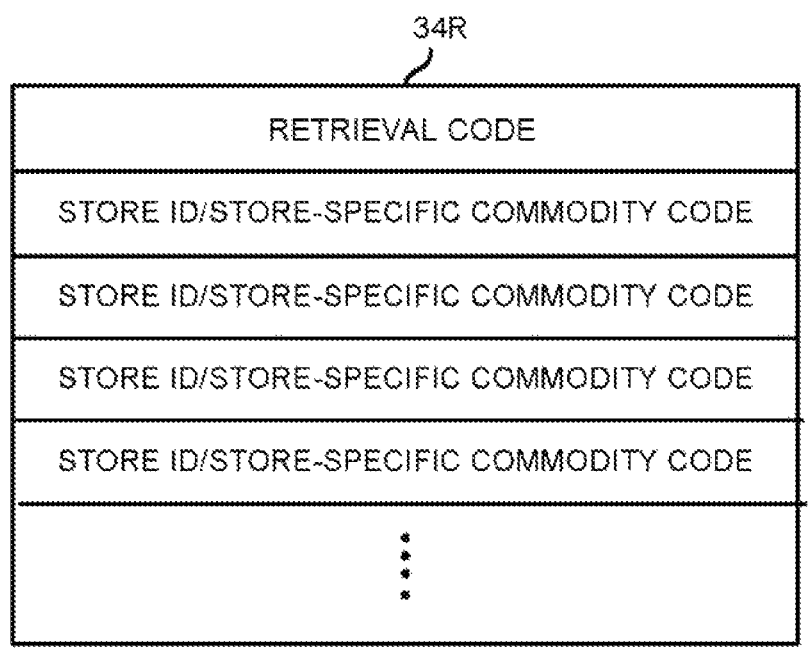
FIG. 5 is a schematic diagram illustrating a data structure of a data record stored in a retrieval code database.

FIG. 5 is a schematic diagram illustrating the data structure of the data record 34R stored in the retrieval code database 34. The retrieval code database 34 stores a data record 34R in which one or more paired data composed of a store ID and a store-specific commodity code are set for each retrieval code which is a category code. The store ID which is one of the paired data is the identification information of the store for selling the commodity specified by the category code of the corresponding retrieval code. The store-specific commodity code which is the other one of the same paired data is a commodity code set for the commodity at the store identified by the store ID.

Figure 6:
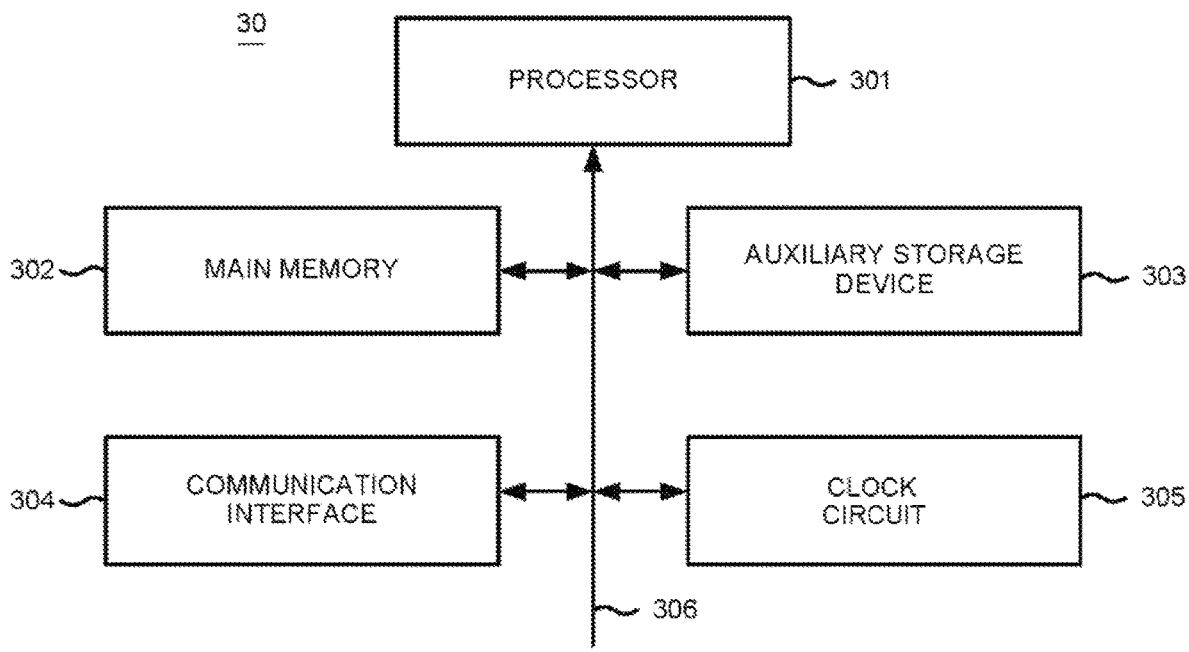
FIG. 6 is a block diagram illustrating a circuit configuration of main portions of an information providing server.

FIG. 6 is a block diagram illustrating the circuit configuration of the main portions of the information providing server 30. The information providing server 30 includes a processor 301, a main memory 302, an auxiliary storage device 303, a communication interface 304, a clock circuit 305, and a system bus 306. In the information providing server 30, the processor 301, the main memory 302, the auxiliary storage device 303, the communication interface 304 and the clock circuit 305 are connected with the system bus 306 directly or via a signal input/output circuit. Thus, in the information providing server 30, the processor 301, the main memory 302 and the auxiliary storage device 303 constitute a computer through the system bus 306 connecting them.

The processor 301 acts as a central part of the computer. The processor 301 controls each section to realize various functions of the information providing server 30 by executing an operating system and an application program.

The main memory 302 includes a non-volatile memory area and a volatile memory area. The main memory 302 stores the operating system and the application program in the non-volatile memory area. The main memory 302 stores data necessary for the processor 301 to execute a processing for controlling each section in the non-volatile or volatile memory area in some cases. The main memory 302 uses the volatile memory area as a work area where data is appropriately rewritten by the processor 301.

The auxiliary storage device 303 acts as an auxiliary storage section of the computer. The auxiliary storage device 303 is, for example, an EEPROM (Electric Erasable Programmable Read-Only Memory), an HDD (Hard Disk Drive), an SSD (Solid State Drive) or the like. The auxiliary storage device 303 stores data used for the processor 301 to execute various processing and data generated in the processing by the processor 301. The auxiliary storage device 303 stores the application program in some cases.

The communication interface 304 is connected to the network 40 and performs data communication with an external device via a network 40 according to a predetermined communication protocol. In an embodiment, the external device corresponds to a relay server of the store system 20.

The clock circuit 305 functions as a time information source of the information providing server. The processor 301 clocks a current date and time based on the time information clocked by the clock circuit 305.

Figure 7:
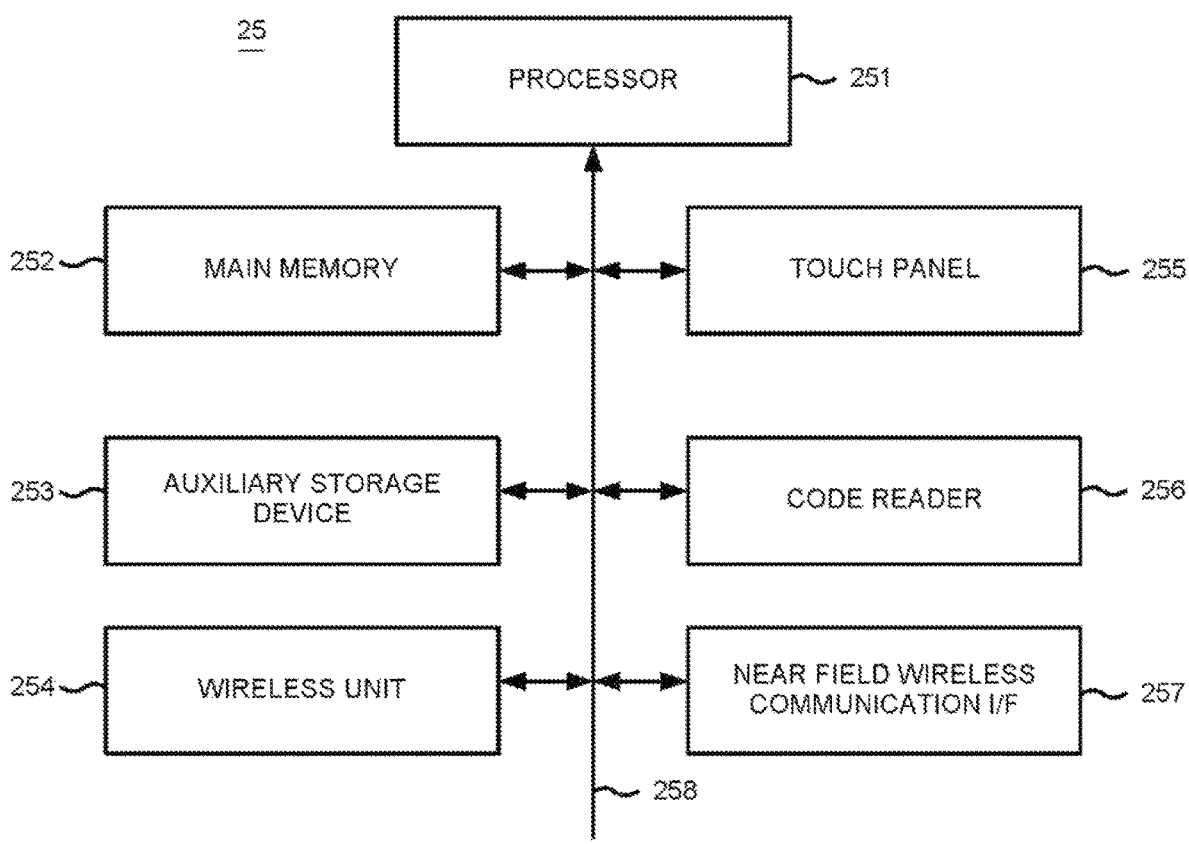
FIG. 7 is a block diagram illustrating a circuit configuration of main portions of an information terminal.

FIG. 7 is a block diagram illustrating the circuit configuration of main portions of the information terminal 25. The information terminal 25 includes a processor 251, a main memory 252, an auxiliary storage device 253, a wireless unit 254, a touch panel 255, a code reader 256, a near field wireless communication interface (I/F) 257, and a system bus 258. In the information terminal 25, the processor 251, the main memory 252, the auxiliary storage device 253, the wireless unit 254, the touch panel 255, the code reader 256 and the near field wireless communication interface 257 are connected with the system bus 258 directly or via a signal input/output circuit. Thus, in the information terminal 25, the processor 251, the main memory 252 and the auxiliary storage device 253 are connected via the system bus 258 to constitute a computer.

The processor 251 acts as a central part of the computer. The processor 251 controls each section to realize various functions of the information terminal 25 by executing an operating system and an application program.

The main memory 252 includes a non-volatile memory area and a volatile memory area. The main memory 252 stores the operating system and the application program in the non-volatile memory area. The main memory 252 stores data necessary for the processor 251 to execute a processing for controlling each section in the non-volatile or volatile memory area in some cases. The main memory 252 uses the volatile memory area as a work area where data is appropriately rewritten by the processor 251.

The auxiliary storage device 253 acts as an auxiliary storage section of the computer. The auxiliary storage device 253 is, for example, an EEPROM, an HDD, an SSD or the like. The auxiliary storage device 253 stores data used for the processor 251 to execute various processing and data generated in the processing by the processor 251. The auxiliary storage device 253 stores the application program in some cases.

The wireless unit 254 transmits and receives data wirelessly to and from the access point 24 according to a predetermined wireless communication protocol.

The touch panel 255 includes both an input device and a display device of the information terminal 25. The code reader 256 optically reads a barcode attached to the commodity. A barcode obtained by converting the common commodity code which is a commodity code unique to the commodity or the store-specific commodity code into barcode is attached to the commodity. The near field wireless communication interface 257 performs near field wireless communication in a non-contact manner with another device having a near field wireless communication interface that operates under the same specification or standard. In an embodiment, the POS terminal 21 is provided with the near field wireless communication interface that operates under the same specification. Therefore, by bringing the information terminal 25 close to the POS terminal 21, the information processed by the information terminal 25 can be transmitted to the POS terminal 21 through the near field wireless communication.

The information terminal 25 having such a configuration stores, in the auxiliary storage device 253, a unique terminal ID for specifying the information terminal 25 and a store ID for specifying the store where the information terminal 25 is used.

Figure 8:
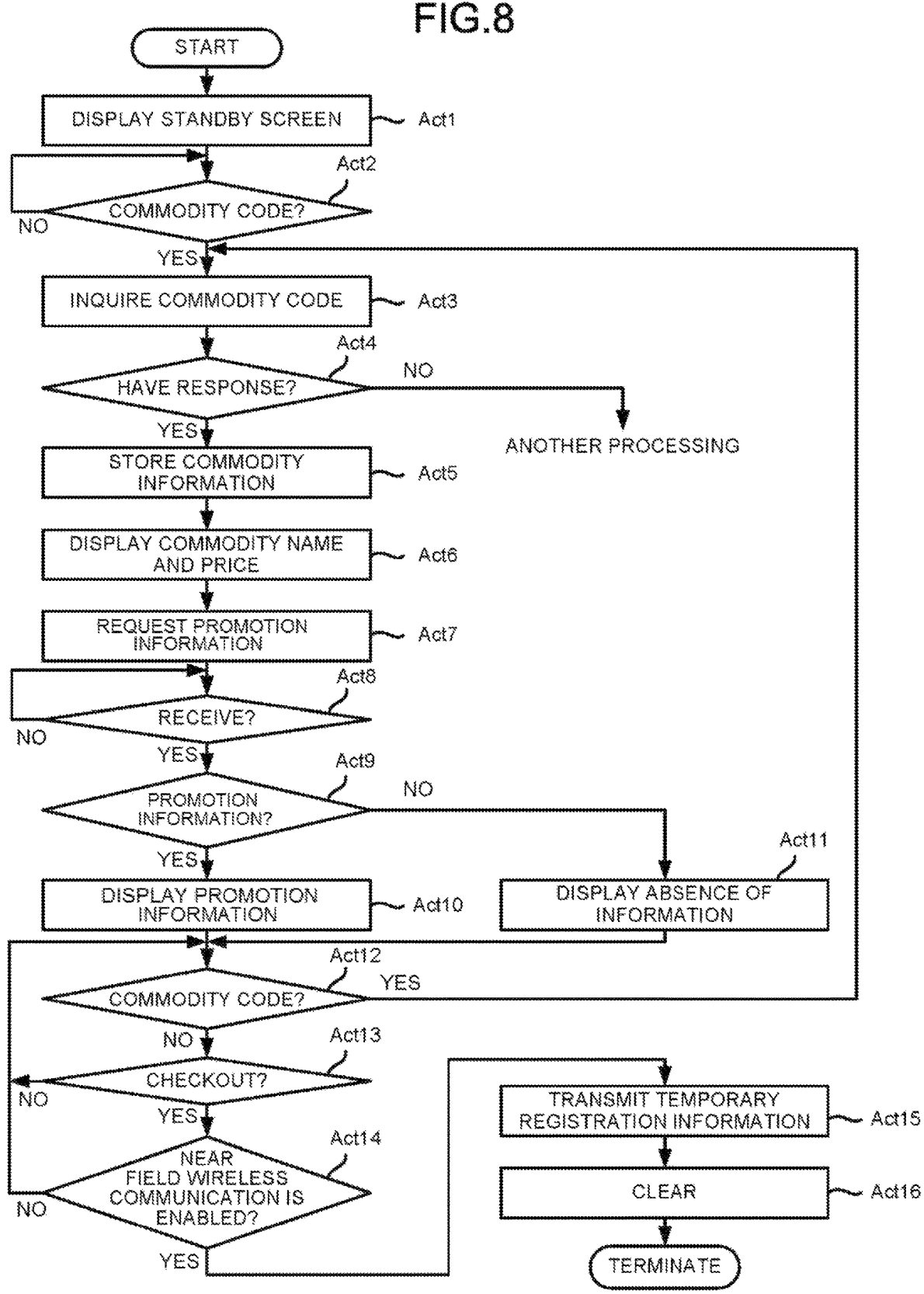
FIG. 8 is a flowchart depicting main procedures of an information processing executed by a processor of the information terminal through executing a control program.
Figure 9:
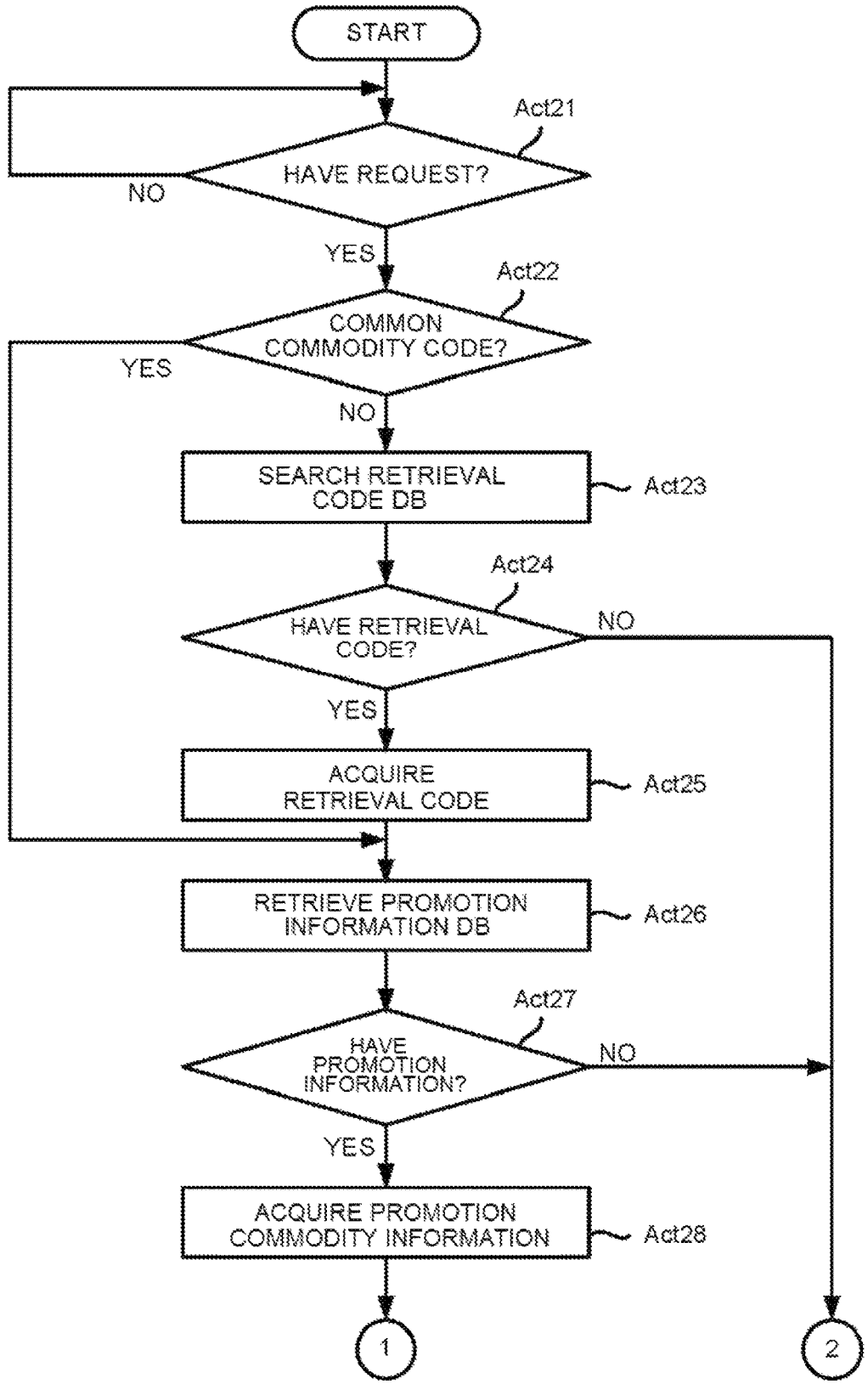
FIG. 9 is a flowchart depicting main procedures of an information processing executed by a processor of the information providing server through executing an information providing program.
Figure 10:
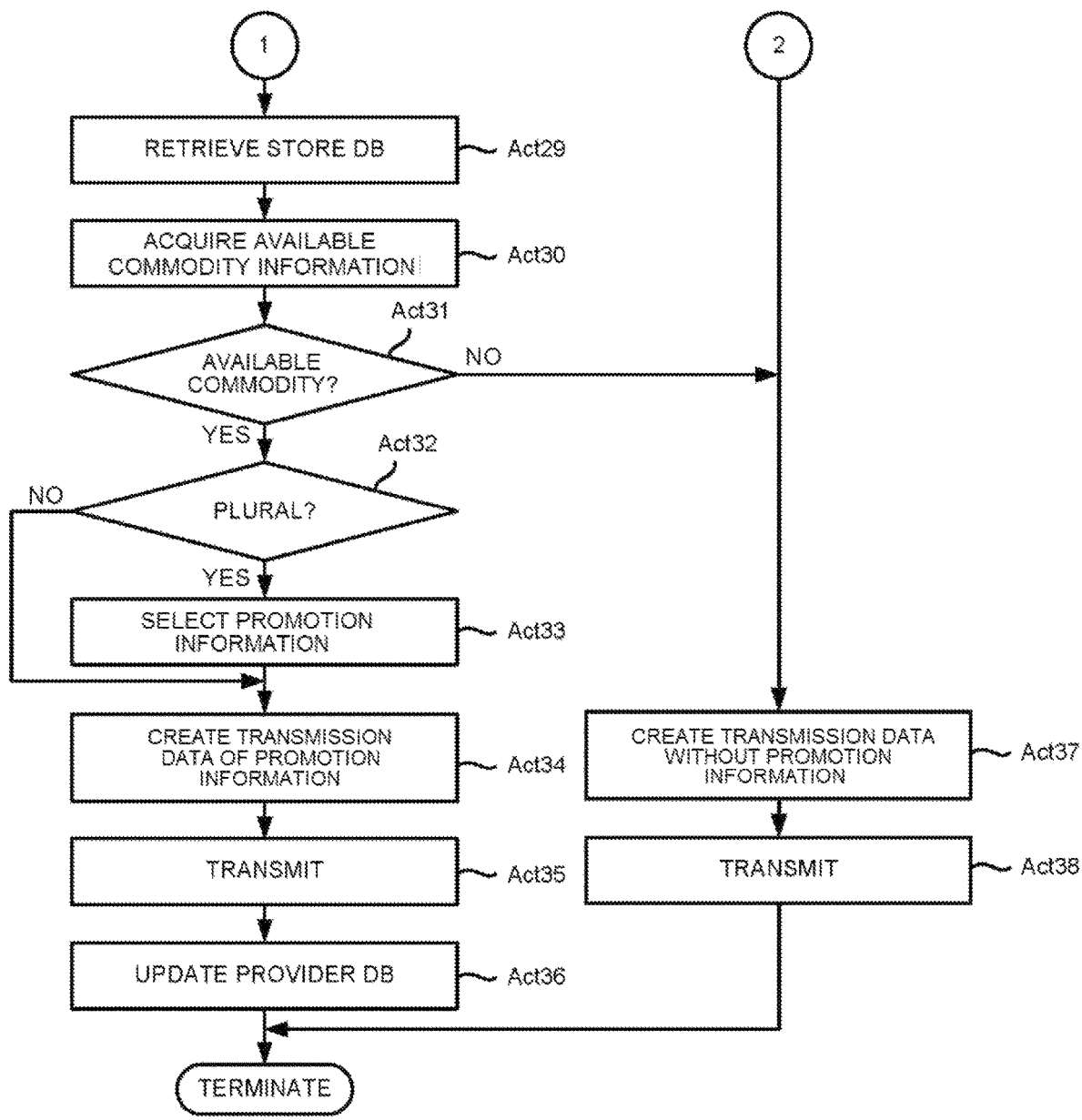
FIG. 10 is a flowchart depicting main procedures of the information processing executed by the processor of the information providing server through the information providing program.

FIG. 8 is a flowchart depicting main procedures of an information processing executed by the processor 251 of the information terminal 25 by executing the control program stored in the main memory 252 or the auxiliary storage device 253. FIG. 9 and FIG. 10 are flowcharts depicting main procedures of an information processing executed by the processor 301 of the information providing server 30 by executing the information providing program stored in the main memory 302 or the auxiliary storage device 303. Hereinafter, the operation of the information providing system 10 is described with reference to FIG. 8 to FIG. 10.

The operation described below is merely an example, and the procedure is not particularly limited as long as similar results can be achieved.

A consumer who enters the affiliated store carries the information terminal 25 to shop. Alternatively, the consumer uses a shopping cart to which the information terminal 25 is attached to do some shopping. Then, if the consumer finds the commodity he/she wants to purchase, the consumer makes the code reader 256 of the information terminal 25 read the barcode attached to the commodity. The consumer puts the commodity whose barcode is already read in the shopping cart or a shopping basket.

As shown in FIG. 8, the processor 251 of the information terminal 25 sets a screen of the touch panel 255 as a standby screen in Act 1. The content of the standby screen is not particularly limited. For example, it may be a screen for introducing a usage method of the information terminal 25 to the consumer.

The processor 251 that displays the standby screen stands by until the commodity code is input in Act 2. In this standby state, if the commodity code is input via the code reader 256 (Yes in Act 2), the processor 251 generates an inquiry command of the commodity code in Act 3. Then, the processor 251 controls the wireless unit 254 to wirelessly transmit the inquiry command. The inquiry command includes the commodity code input in Act 2 and the terminal ID stored in the auxiliary storage device 253. The commodity code may be the common commodity code or the store-specific commodity code.

The inquiry command wirelessly transmitted from the information terminal 25 is received by the access point 24 and then transmitted to the store server 22 via the LAN 26. The store server 22 retrieves the commodity database 27 with the commodity code included in the inquiry command. Then, the store server 22 detects a data record including the commodity code from the commodity database 27, and creates a response command including at least the commodity code, the commodity name, the price and the like of the data record. The store server 22 performs control to transmit the response command to the information terminal 25 identified by the terminal ID contained in the inquiry command. Through such a control, the response command is wirelessly transmitted from the access point 24 to the information terminal 25.

The processor 251 of the information terminal 25 transmitting the inquiry command stands by until the response command is received in Act 4. If the response command is received within a predetermined period of time (Yes in ACT 4), the processor 251 stores the commodity information such as the commodity code, the commodity name, and the price contained in the response command in a temporary registration memory in Act 5. The temporary registration memory is formed in apart of the volatile area of the main memory 252. The processor 251 displays the commodity name and the price of the commodity information on the touch panel 255 in Act 6. If the response command cannot be received within the predetermined period of time (No in ACT 4), the processor 251 displays, for example, a message indicating a communication error on the touch panel 255, and does not execute processing subsequent to Act 5.

If the processing in Act 6 is completed, the processor 251 creates a request command of the promotion information in Act 7. Then, the processor 251 controls the wireless unit 254 to wirelessly transmit the request command. The request command includes the commodity code input in Act 2, and the store ID and the terminal ID stored in the auxiliary storage device 253.

The request command wirelessly transmitted from the information terminal 25 is received by the access point 24 and then transmitted to the relay server 23 via the LAN 26. The relay server 23 transmits the request command via the network 40 to the information providing server 30.

As shown in FIG. 9, the processor 301 of the information providing server 30 stands by until the request command is received in Act 21. If the request command is received via the communication interface 304 (Yes in Act 21), the processor 301 determines whether the commodity code contained in the request command is the common commodity code or the store-specific commodity code in Act 22. Whether the commodity code is the common commodity code can be determined according to, for example, the first two digits (e.g., "11"). As a result of the determination, if the commodity code is the common commodity code (Yes in Act 22), the processor 301 proceeds to the processing in Act 26.

On the other hand, if the commodity code is the store-specific commodity code (No in Act 22), the processor 301 retrieves the retrieval code database 34 using the store ID and the store-specific commodity code included in the request command in Act 23. Then, the processor 301 determines whether or not there is a data record 34R including the paired data composed of the store ID and the store-specific commodity code in Act 24. As a result of the determination, if the data record 34R including the corresponding paired data can be detected (Yes in Act 24), the processor 301 acquires the retrieval code from the data record 34R in Act 25. Then, the processor 301 proceeds to the processing in Act 26. If the data record 34R including the corresponding paired data cannot be detected (No in Act 24), the processor 301 proceeds to the processing in Act 37 in FIG. 10.

In Act 26, the processor 301 retrieves the promotion information database 31. Specifically, if the commodity code included in the request command is the common commodity code, the processor 301 sets the commodity code as the retrieval code. Then, the processor 301 retrieves the data record 31R in which the retrieval target flag is "0" with the retrieval code. On the other hand, if the commodity code contained in the request command is the store-specific commodity code, the processor 301 retrieves the data record 31R in which the retrieval target flag is "1" with the retrieval code acquired in Act 25.

The processor 301 retrieving the promotion information database 31 determines whether or not there is the data record 31R containing a matching retrieval code in Act 27. As a result of the determination, if the data record 31R containing the matching retrieval code is detected (Yes in Act 27), the processor 301 acquires the promotion commodity information from the data record 31R in Act 28. At this time, if more than two data records 31R containing the matching retrieval code are detected, the processor 301 acquires the promotion commodity information from all the data records 31R. Then, the processor 301 proceeds to the processing in Act 29 in FIG. 10. If no data record containing the matching retrieval code can be detected (No in Act 27), the processor 301 proceeds to the processing in Act 37 in FIG. 10.

In Act 29, the processor 301 retrieves the store database 33 with the store ID contained in the request command. Then, the processor 301 acquires the available commodity information from the data record 33R including the corresponding store ID in Act 30.

In Act 31, the processor 301 acquiring the available commodity information refers to the available commodity information to determine whether or not the commodity specified by the commodity name of the promotion commodity information acquired in Act 28 is available for sale in the store identified by the store ID. At this time, if more than two promotion commodity information is acquired in Act 28, the processor 301 makes the same determination for each promotion commodity information. As a result of the determination, if there is at least one type of the commodity determined to be available for sale in the store identified by the store ID (Yes in Act 31), the processor 301 proceeds to the processing in Act 32. If there is not the corresponding commodity (No in Act 31), the processor 301 proceeds to the processing in Act 37.

In Act 32, the processor 301 determines whether or not there are two or more types of commodities determined to be available for sale in the store identified by the store ID. If there is only one type of the commodity (No in Act 32), the processor 301 proceeds to the processing in Act 34. On the other hand, if there are two or more types of commodities (Yes in Act 32), the processor 301 selects one promotion information according to a predetermined determination requirement from the promotion information relating to the plural types of commodities in Act 33.

A parameter as the first determination requirement is the bidding decision index. Specifically, the processor 301 compares the bidding decision indexes of the corresponding data records 31R. Then, the processor 301 selects the promotion information in the data record 31R having the largest bidding decision index. Here, when there are plural data records having the largest bidding decision index, a parameter as a second determination requirement is the bidding price. Specifically, the processor 301 compares the bidding prices of the corresponding data records 31R. Then, the processor 301 selects the promotion information of the data record 31R having the highest bidding price. Here, a parameter as a third determination requirement when the bidding prices are also equal is the conversion rate. Specifically, the processor 301 compares the conversion rates of the corresponding data records 31R. Then, the processor 301 selects the promotion information in the data record 31R having the smallest conversion rate.

Upon completion of selecting any one promotion information from the plurality of the promotion information in Act 33, the processor 301 proceeds to the processing in Act 34.

In Act 34, the processor 301 creates transmission data of the promotion information. The transmission data includes destination information. The destination information refers to the store ID and the terminal ID included in the request command. The promotion information is the promotion information relating to the commodity when there is only one type of the commodity determined to be available for sale, and in the case of plural types of commodities determined to be available for sale, the promotion information is the promotion information selected in Act 33.

The processor 301 controls the communication interface 304 so as to transmit the transmission data of the promotion information in Act 35. Through such a control, the transmission data is transmitted to the relay server 23 of the store specified by the store ID contained in the destination information via the network 40, and further wirelessly transmitted via the access point 24 to the information terminal 25 specified by the terminal ID contained in the destination information.

In Act 36, the processor 301 retrieves the provider database 32 with the provider ID of the data record 31R including the transmitted promotion information. Then, the processor 301 updates the cost data in the data record 32R including the provider ID. Specifically, the processor 301 subtracts the bidding price in the data record 31R including the transmitted promotion information from the cost data.

On the other hand, in Act 37, the processor 301 creates the transmission data indicating that there is no information. The transmission data also includes the same destination information as the transmission data of the promotion information. The processor 301 controls the communication interface 304 to transmit the transmission data indicating that there is no information in Act 38. Through such a control, the transmission data is transmitted via the network 40 to the relay server 23 of the store specified by the store ID contained in the destination information, and further wirelessly transmitted via the access point 24 to the information terminal 25 specified by the terminal ID contained in the destination information. However, at this time, the processor 301 does not update the provider database 32. Thus, the processor 301 terminates the information processing when the request command is received in Act 21.

Here, the computer having the processor 301 as the central part realizes a specifying module by executing the processing in Act 21 to Act 22 in FIG. 9. Further, the computer realizes a decision module by executing the processing in Act 23 to Act 25 in FIG. 9. The computer realizes a detection module by executing the processing in Act 26 to Act 28 in FIG. 9. The computer realizes the determination module by executing the processing in Act 29 to Act 31 in FIG. 10. The computer realizes a selection module by executing the processing in Act 32 to Act 33 in FIG. 10. The computer realizes an output module by executing the processing in Act 34 and Act 35 in FIG. 10. The computer realizes a charging module by executing the processing in Act 36 in FIG. 10.

Returning to the description of FIG. 8 again. The processor 251 of the information terminal 25 transmitting the request command of the promotion information in Act 7 stands by until the data is received from the information providing server 30 in Act 8. If the data is received from the information providing server 30 via the wireless unit 254 (Yes in Act 8), the processor 251 confirms whether or not the data includes the promotion information in Act 9. If the data including the promotion information is received (Yes in Act 9), the processor 251 displays the promotion information on the touch panel 255 in Act 10. At this time, the processor 251 displays the promotion information on the same screen as the commodity name and the price displayed in Act 6.

On the other hand, if the data indicating that there is not the promotion information is received (No in Act 9), the processor 251 displays a message indicating that there is no promotion information on the touch panel 255 in Act 11. At this time, the processor 251 displays the message on the same screen as the commodity name and price displayed in the processing in Act 6 as well.

Therefore, a consumer who uses the code reader 256 of the information terminal 25 to read the barcode attached to the commodity to be purchased can confirm the promotion information provided from the information providing server 30 in association with the commodity together with the commodity price by sight. Alternatively, the consumer can confirm that there is no promotion information associated with that commodity by sight.

Every time the consumer finds a commodity he/she wants to purchase in the process of shopping, the consumer makes the code reader 256 of the information terminal 25 read the barcode attached to the commodity. If the customer finishes the shopping, the consumer goes to a checkout center where the POS terminal 21 is installed and touches a checkout button displayed on a part of the screen area of the touch panel 255.

Specifically, if the processing in Act 10 or Act 11 is completed, the processor 251 confirms whether or not a next commodity code is input in Act 12. If no commodity code is input (No in Act 12), the processor 251 confirms whether or not the checkout button is touched in Act 13. If the checkout button is not touched (No in Act 13), the processor 301 returns to the processing in Act 12 to determines whether or not the commodity code is input again. Here, the processor 251 stands by until the commodity code is read in Act 12 or the checkout button is touched in Act 13.

In the standby state, if a new commodity code is read (Yes in Act 12), the processor 251 returns to the processing in Act 3. Then, the processor 251 repeats the processing in the same way as described above.

On the other hand, if it is detected that the checkout button is touched (Yes in Act 13), the processor 251 determines whether or not the near field wireless communication through the near field wireless communication interface 257 is enabled in Act 14. In an embodiment, if the POS terminal 21 is present in the vicinity of the information terminal 25, the near field wireless communication is enabled. If there is no POS terminal 21 in the vicinity of the information terminal 25, the near field wireless communication is disabled. If near field wireless communication is disabled (No in Act 14), the processor 251 returns to the standby state in Act 12 and Act 13.

If the near field wireless communication is enabled (Yes in Act 14), the processor 251 transmits the commodity information stored in the temporary registration memory to the POS terminal 21 using the near field wireless communication in Act 15. Then, the processor 251 completing the transmission of the commodity information clears the temporary registration memory in Act 16. As described above, the processor 251 terminates the information processing after inputting the first commodity code in Act 2.

Incidentally, in the POS terminal 21 receiving the commodity information through the near field wireless communication, the sales data of the commodity purchased by the consumer is registered based on the commodity information, and the payment amount of the commercial transaction is calculated. If the payment data of the consumer for the payment amount is input to the POS terminal 21, the POS terminal 21 executes a settlement processing such as issuing a receipt, dispensing a change or the like.

As described above, according to the information providing system 10 of an embodiment, before settlement of a commodity that a customer wants to purchase and whose barcode is read using the information terminal 25 in the store, the information of another commodity associated with the commodity can be offered to the customer who performs the reading operation. At this time, the offered information is useful information for both the consumer and the provider of that information. Moreover, since it is also the information relating to the commodity available for sale in the store, it is also the useful information contributing to sales promotion for the store.

In addition, the information offered to the consumer is extracted by the information providing server 30 managed by the business entity that manages the information providing service, and then is output to the information terminal 25. Therefore, there is no burden on the store side caused by the management of the promotion information. Thus, it is possible to realize the information providing system 10 capable of providing useful information contributing to the sales promotion to the consumer in the process of shopping, without increasing the burden on the store side caused by the management of the information.

Incidentally, if the information of another commodity associated with the commodity specified by the barcode read by the consumer is provided from different providers, respectively, the information providing server 30 selects one promotion information according to a predetermined determination requirement and outputs it to the information terminal 25. The determination requirement is a parameter that can be adjusted by the provider. Therefore, the provider can make a cost-effective sales promotion by appropriately adjusting the parameter which is the determination requirement.

In addition, the bidding price is one of the parameters which are the determination requirements. The bidding price is an amount charged to the provider of the promotion information output to the information terminal 25. Therefore, the provider can implement effective advertisement for the provider by appropriately adjusting the bidding price in consideration of the cost effectiveness.

The barcode read by the information terminal 25 may be not only the barcode of the common commodity code but also the barcode of the store-specific commodity code. Therefore, it is possible to provide the information contributing to the sales promotion even for the customer who wants to purchase the fresh food by targeting the fresh food set with the different code for each store.

Other embodiments are described below.

In the above embodiments, the information providing server 30 includes the promotion information database 31, the provider database 32, the store database 33, and the retrieval code database 34. In another embodiment, all or at least one of these databases 31 to 34 is included in a database server connected to the information providing server 30 via the network. Then, the information providing server 30 accesses the database server to acquire necessary information from the databases 31 to 34. In another embodiment, the available commodity information stored in the store database 33 is dispersedly stored in the store server 22 of each store. Then, the processor 301 of the information providing server 30 does not retrieve the available commodity information in the store database 33, but retrieves the available commodity information stored in the store server 22 of the corresponding store, and then determines whether or not the available commodity information is information relating to the store. With such a configuration, the store database 33 can be omitted from the information providing server 30.

In the above embodiments, the processor 251 of the information terminal 25 includes the store ID in the request command. In another embodiment, the relay server 23 adds the store ID to the request command received from the information terminal 25 and then transmits it to the information providing server 30. By doing this, there is no need for the information terminal 25 to store the store ID.

In an embodiment, the promotion commodity information is the name of the commodity. The promotion commodity information is not limited to the name of commodity. For example, the common commodity code may be used as the promotion commodity information. However, the store-specific commodity code cannot be used as the promotion commodity information since it is different depending on the store even it is the commodity code of the commodity in the same category.

The information providing server 30 is transferred with the program such as the information providing program stored in the main memory 302 or the auxiliary storage device 303. However, the present invention is not limited thereto, and the information providing server 30 may be transferred in a state in which the program is not stored in the main memory 302 or the auxiliary storage device 303. In this case, the information providing program transferred independent of the information providing server 30 is written into the storage device capable of writing of the information supply server 30 in response to an operation by a user. The transfer of the program at this time may be realized by recording the program on a removable storage medium or by communication via the network. The recording medium may be in any form as long as it can store the program and can be read by the device such as the CD-ROM or a memory card. A function obtained by installing or downloading the program may be realized in cooperation with an OS (Operating System) or the like in the device.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A portable wireless communication terminal installed on a shopping cart, comprising:
   a reader;
   a first wireless communication interface;
   a second wireless communication interface;
   a display; and
   a processor configured to:
      control the reader to read a commodity code that identifies a commodity to be purchased by a customer in a store;
      wirelessly retrieve through the first wireless communication interface, information for promotion relating to the commodity; and
      upon receipt of the information for promotion, control the display to display a screen indicating the received information;
      upon receipt of an input for checkout via the screen, determine whether the communication terminal can communicate with a Point of Sales (POS) terminal through the second wireless communication interface; and
      upon determining that the communication terminal can communicate with the POS terminal, control the second wireless communication interface to transmit the commodity code to the POS terminal for checkout.

2. The portable wireless communication terminal according to claim 1, wherein
   the information for promotion is acquired by the server based on one or more predetermined parameters.

3. The portable wireless communication terminal according to claim 2, wherein
   one of the parameters is a bidding decision index.

4. The portable wireless communication terminal according to claim 2, wherein
   one of the parameters is a promotion cost.

5. The portable wireless communication terminal according to claim 2, wherein one of the parameters is a conversion rate that indicates a rate of a total number of purchases of a commodity to a total number of appearances of the information on the display.

6. The portable wireless communication terminal according to claim 1, wherein
the commodity code is used for retrieving from a database the information for promotion.

7. The portable wireless communication terminal according to claim 6, wherein
the commodity code includes a store code of the store.

8. The portable wireless communication terminal according to claim 1, wherein
a cost of an information provider is calculated by the server for the displayed information.

9. The portable wireless communication terminal according to claim 1, wherein
the processor controls the display to display a name of the commodity retrieved from a database on a store server when the reader reads the commodity code.

10. The portable wireless communication terminal according to claim 9, wherein
the information is transmitted from the server outside a local network to which the store server is connected.

11. A method carried out by a portable wireless communication terminal, the method comprising:
reading with a reader a commodity code that identifies a commodity to be purchased by a customer in a store;
transmitting to a server through a first wireless communication interface, the commodity code read by the reader;
retrieving wirelessly information for promotion relating to the commodity;
upon receipt of the information for promotion, displaying on a screen indicating the received information;
upon receipt of an input for checkout via the screen, determining whether the communication terminal can communicate with a Point of Sales (POS) terminal through a second wireless communication interface; and
upon determining that the communication terminal can communicate with the POS terminal, transmitting the commodity code to the POS terminal through the second wireless communication interface for checkout.

12. The method according to claim 11, further comprising:
the information for promotion is acquired by the server based on one or more predetermined parameters.

13. The method according to claim 12, wherein
one of the parameters is a bidding decision index.

14. The method according to claim 12, wherein
one of the parameters is a promotion cost.

15. The method according to claim 12, wherein
one of the parameters is a conversion rate that indicates a rate of a total number of purchases of a commodity to a total number of appearances of the information on the display.

16. The method according to claim 11, further comprising:
the commodity code is used for retrieving from a database the information for promotion.

17. The method according to claim 16, wherein
the commodity code includes a store code of the store.

18. The method according to claim 11, further comprising:
a cost of an information provider is calculated by the server for the displayed information.

19. The method according to claim 11, further comprising:
displaying a name of the commodity retrieved from a database on a store server when the reader reads the commodity code.

20. A non-transitory computer readable medium storing a program causing a computer to execute a method of providing information on a portable wireless communication terminal, the method comprising:
reading with a reader a commodity code that identifies a commodity to be purchased by a customer in a store;
transmitting to a server through a first wireless communication interface, the commodity code read by the reader;
retrieving wirelessly information for promotion relating to the commodity;
upon receipt of the information for promotion, displaying on a screen indicating the received information;
upon receipt of an input for checkout via the screen, determining whether the communication terminal can communicate with a Point of Sales (POS) terminal through a second wireless communication interface; and
upon determining that the communication terminal can communicate with the POS terminal, transmitting the commodity code to the POS terminal through the second wireless communication interface for checkout.

* * * * *